Patented June 6, 1933

1,913,294

UNITED STATES PATENT OFFICE

HEINRICH SCHICHT, OF AUSSIG, CZECHOSLOVAKIA

METHOD OF PRODUCING NONALCOHOLIC FRUIT JUICES

No Drawing. Application filed August 12, 1931, Serial No. 556,711, and in Czechoslovakia October 21, 1927.

This application is a continuation in part of my application Serial No. 312,748, of October 15th, 1928.

The production of non-alcoholic fruit juices, in which the natural taste of the fruit in question is maintained, in a form suitable and convenient for sale and use, forms a problem which has not yet been solved. Preservation by sterilizing changes the taste and has the disadvantage that the goods can only be stored and despatched in bottles, which makes them so expensive that they cannot come into question as a drink for the general public. It is true that preservation by chemical means partially obviates these drawbacks, but it is accompanied by a considerable risk as far as the health of the consumer is concerned. Really effective preservatives are therefore forbidden everywhere by law.

In order to reduce the expense involved by bottles and freightage, an attempt has been made to concentrate fruit juices in a vacuum. In such a case, however, vitamins sensitive to heat are destroyed and the taste of the juices is changed so unfavourably that they are rejected by those in the trade. Other methods aim at concentrating the juices by freezing. The products obtained thereby are, it is true, satisfactory, but the methods were soon given up as being too expensive.

Attempts to concentrate the fruit juices at a very low temperature in a high vacuum, also involved the drawback that, even in the case of moderate concentrations, the juices gelatinized, which made itself evident by difficult solubility when re-diluted and made pouring out impossible. Another great drawback of this method consists in this, that the concentration and temperature which must be maintained in order not to change the taste of the juices contributes considerably towards the rapid growth of the yeast cells and other microorganisms always present in the fresh juices. The concentrating apparatus become at once incubators.

It has been observed that all these difficulties can be obviated by employing a combined method, in which the juice before concentration, is sterilized and clarified by so-called sterilizing filters. It is possible by this means to concentrate the fruit juice in suitable apparatus, without even a partial fermentation taking place, at such low temperatures that its natural properties are not affected either in respect to taste or aroma, and instead of a jelly, a syrup is formed, which, although strongly concentrated, remains very readily soluble in water.

For this purpose the fresh, clarified fruit juices are freed from germs by degerminating filters. The germ-free products are then stored sterile for 4-6 months in a cool chamber at 15° C. It has been observed in this connection that during this storing the juices undergo an unknown change which completely depresses their gelatinizing capabilities, so that no gelatinization occurs during the subsequent evaporation in high vacuum at 6-10 mm. of mercury and at temperatures of 25-30° C. By means of these new expedients it is ensured that the juices, although they are thickened to $\frac{1}{12}$, and even more, of their original volume, do not gelatinize and that neither their colour, taste, nor vitamins, are impaired.

What I claim is:

1. A process for producing readily-soluble and concentrated non-gelatinizing, alcohol-free fruit juices, consisting in the steps of clarifying the fresh fruit juices, sterilizing the same by means of degerminating filters, storing the degerminated juices sterile for 4 to 6 months at temperatures of 15° C., and then thickening the stored product at low temperatures in a high vacuum.

2. A process for producing readily-soluble and concentrated non-gelatinizing, alcohol-free fruit juices, consisting in the steps of clarifying the fresh fruit juices, sterilizing the same by means of degerminating filters, storing the degerminated juices sterile for 4-6 months at temperatures of 15° C., and then thickening the stored product at temperatures of 25-30° C. in a vacuum of 6-10 mm. of mercury.

In testimony whereof I have signed my name to this specification.

HEINRICH SCHICHT.